Oct. 27, 1970   K. R. COMEY, JR   3,535,781

METHOD OF MAKING STRIP CONTACT MATERIAL

Filed Dec. 29, 1966

Kenneth R. Comey Jr.,
Inventor.
Koenig, Senniger, Powers and Leavitt,
Attorneys.

United States Patent Office 3,535,781
Patented Oct. 27, 1970

3,535,781
METHOD OF MAKING STRIP CONTACT MATERIAL
Kenneth R. Comey, Jr., Norwood, Mass., assignor to Texas Instruments Incorporated, Dallas, Tex., a corporation of Delaware
Filed Dec. 29, 1966, Ser. No. 616,995
Int. Cl. C23b 5/48; H01r 9/22
U.S. Cl. 29—630                    7 Claims

ABSTRACT OF THE DISCLOSURE

An electrical contact material and method of manufacture is disclosed. A metal diffusion-barrier layer is disposed in a recess in a base layer. An opening is provided at the surface of the metal diffusion-barrier layer opposite the base layer in order to receive a precious-metal contact layer which is disposed in this recess. The base, barrier, and precious-metal layers are metallurgically bonded.

---

This invention relates to the manufacture of electrical contact material in strip form, using precious metal for the contact surface and another metal as a supporting base, being an improvement upon prior so-called precious-metal clad inlays.

Among the several objects of this invention may be noted the provision of a method for manufacturing multilayer strip contact materials including a thin layer in strip form of precious or noble metal without destroying the desired electrical or other properties of the precious or noble metal; the provision of a method of manufacturing strip contact material having a supporting metal base and an inlay metal therein so that there is no diffusion of base metal into the inlay metal; and the provision of improved strip contact material manufactured according to the method of the invention. Other objects and features will be in part apparent and in part pointed out hereinafter.

The invention accordingly comprises the method and product hereinafter described, the scope of the invention being indicated in the following claims.

In the accompanying drawings, in which one of various possible embodiments of the invention is illustrated, FIG. 1 is a sectioned perspective view showing three layers which are to be bonded together to form strip contact material according to the invention;

Corresponding reference characters indicate corresponding parts throughout the several views of the drawings. The drawings are illustrative and not to scale.

Because of the high cost of precious metals, they are frequently bonded to a base metal of comparatively lower cost so that the more expensive precious metal comprises only a small part of the resulting article. For example, in forming strip contact material thin strips of precious metal on the order of 0.0001 inch are clad to a base metal with the precious metal comprising the electrical contact surface and with the base metal forming a supporting backing strip for the precious metal. The purpose of the thinness of the precious metal is to minimize cost. However, when the precious metal is bonded to the metal base, as by solid-phase or other metallurgical bonding, for example, some of the base metal may diffuse into and even through the thin precious metal layer, thereby destroying or at least reducing the desired electrical or other properties of the precious metal. Diffusion is particularly troublesome when materials such as copper or copper alloys, nickel or nickel alloys, iron or iron alloys, or the copper double clad with stainless steel or nickel base alloys composite described in U.S. Pat. No. 3,251,660, assigned to the assignee of the instant application, are used for the base layer since such materials are heat treated at high temperatures. The method of this invention eliminates diffusion of the base metal into the thin precious metal layer so that in the resulting article the precious metal layer is free of the base metal or its deleterious effects.

Figure 1:
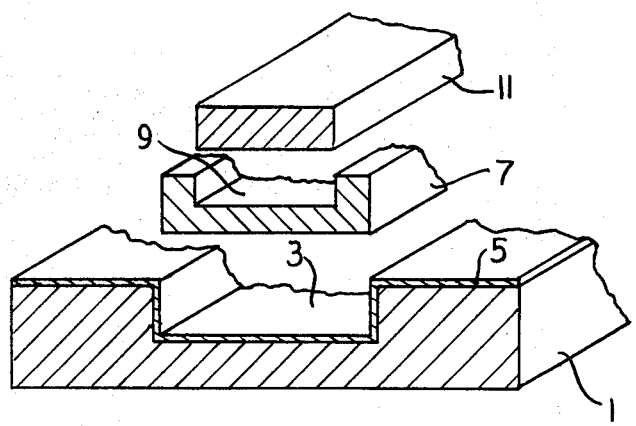

Referring to the drawings, a backing strip 1 of base metal has a shallow groove 3 in its upper surface and preferably extending substantially the entire length of the strip. The stip 1 may be composed of beryllium copper or Phosphor bronze alloy, for example. As shown in FIG. 1 the groove has a flat bottom and parallel sides but it may have other configurations or shapes, as desired. The groove may be formed by milling the base 1 or by other appropriate operation. If the metal used in base layer 1 is one such as aluminum, which forms a tenacious oxide, or other metallurgically unbondable material, then it is preferably electroplated, as for example with nickel silver, gold, platinum or their alloys or the like, on at least its upper surface as shown at 5 to provide a readily bondable surface. Otherwise this electroplating is not necessary. The thickness of strip 1 is not critical, being sufficient to provide a good support.

A metal interliner or barrier strip 7 is provided to form, in the completed product, a diffusion barrier layer between the base metal of strip 1 and a precious metal strip. The thickness of strip 7 is preferably somewhat greater than that of the precious metal strip 11 to be described below and is thinner than the base strip 1. Preferably the strip 7 is substantially the same width as groove 3 in base layer 1 and is slightly thicker than the depth of the groove 3. The width of strip 7 is slightly narrower when the upper surface of the metal base layer 1 is electroplated. Strip 7 is provided with a shallow recess 9 in its upper surface, the recess being shown in the shape of a groove of appropriate width which preferably extends the entire length of the strip. Preferably, the groove is flat across its bottom and its sides are straight and substantially parallel to each other, but it may have other forms.

At 11 is shown a comparatively thin strip of precious metal having a width substantially the same as the width of groove 9 and a thickness slightly greater than the depth of groove 9. The thickness of strip 11 (and the depth of groove 9) may be varied depending upon the precious metal used and the intended use of the article resulting from manufacture of the strip material. For example, for strip material which is to be used for switch contacts, the bar 11 may have a thickness of approximately 0.0001 inch.

Figure 2:
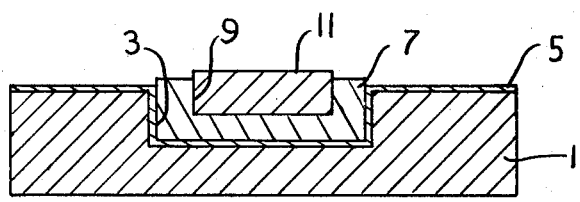
FIG. 2 is a cross section showing the layers of FIG. 1 bonded together.

Strip 11 is placed in groove 9 of the barrier or interliner strip 7 and metallurgically bonded. Then strip 7 is placed in groove 3 and then metallurgically bonded. Thus, bar 11 is bonded to strip 7 and strip 7 is bonded to the strip 1. Bonding is preferably accomplished by rolling between squeeze rolls. The bonding may take place in either the solid or liquid phase. If desired, all three of the strips 11, 7 and 1 may be simultaneously assembled and simultaneously bonded. The resulting material is shown in FIG. 2 of the drawings to comprise a composite three-layer strip in which the strip 11 of precious metal is physically separated from the base strip 1 by lining strip 7, the latter constituting the barrier or interliner which bars diffusion between layers 1 and 11. It is to be understood that the electroplating 5, when used, is not depended upon to act as a barrier. By using a pressure-bonding operation each layer of the composite strip is squeezed into pressure contact with and firmly bonded to the adjacent layer or layers.

Figure 3:
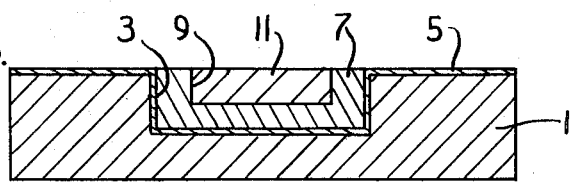
FIG. 3 is a cross section showing the completed strip material.

While the strip material is useful in the form shown in FIG. 2, it is preferred that the strips 7 and 11 be milled or otherwise machined or rolled until the upper surfaces thereof are at least substantially flush with the upper surface of the base layer 1, whether electroplated or not (see FIG. 3). The strips 7 and 11 are shown as being flush with the electroplated material 5; however, it will be understood that the electroplated material may also be removed at this time if it is not needed to protect the upper lateral surfaces of the strip 1.

As above indicated, the strip 11 is preferably composed of a precious metal which may be gold, silver, platinum and their alloys or the like. The base 1 may be copper, beryllium copper, Phosphor bronze or other metals suitable for use as a base strip. The interlayer 7 may be nickel, stainless steel, molybdenum tantalum or other metals which will form a barrier layer to prevent diffusion between the base metal and the precious metal when the three strips are bonded together, whether or not the electroplating 5 is used.

In view of the above, it will be seen that the several objects of the invention are achieved and other advantageous results attained.

As various changes could be made in the above method and product without departing from the scope of the invention, it is intended that all matter contained in the above description or shown in the accompanying drawings shall be interpreted as illustrative and not in a limiting sense.

What is claimed is:

1. The method of manufacturing electrical contact strip material comprising forming a groove in a conductive metal base strip, forming a groove in a metal conductive barrier strip which is shaped on its side opposite its groove substantially to fit into said groove in a base strip, forming a conductive strip of precious metal substantially to fit into the groove in the barrier strip, and metallurgically bonding the base and barrier strips and the barrier and precious-metal strips.

2. The method according to claim 1 wherein the base strip is protected from the formation of any bond-deterrent material by the inclusion in the method of the step of metal-plating the groove in the base strip with a metal which is not bond-deterrent before the barrier strip is placed therein and bonded.

3. The method according to claim 2 wherein the metal-plating step is electrolytic, the base strip is a metal selected from the group consisting of copper and copper alloys, nickel and nickel alloys, iron and iron alloys, and copper double clad with stainless steel or nickel base alloy the barrier layer is a metal selected from the group consisting of nickel, stainless steel tantalum and molybdenum, the precious-metal strip is a metal selected from the group consisting of gold, silver and platinum and their alloys and electrolytically plated metal is selected from the group consisting of nickel silver, gold and platinum and their alloys.

4. The method according to claim 2 wherein the plating on the base strip extends laterally from its groove and including the step of machining the precious-metal strip and the barrier strip at least to the plating on the base strip which extends from said groove.

5. The method according to claim 1 wherein the metallurgical bonding is carried out by solid-phase bonding under pressure.

6. The method according to claim 1 wherein the base strip is a metal selected from the group consisting of copper, beryllium copper, and Phosphor bronze, the barrier layer is a metal selected from the group consisting of nickel, stainless steel tantalum and molybdenum, and the precious-metal strip is a metal selected from the group consisting of gold, silver and platinum.

7. The method according to claim 1 including the step of machining the precious-metal strip and the barrier strip at least to the base strip.

References Cited

UNITED STATES PATENTS

| | | | |
|---|---|---|---|
| 1,571,540 | 2/1926 | Davignon | 29—472.3 |
| 2,395,877 | 3/1946 | Keene | 29—472.3 |
| 2,608,753 | 9/1952 | Mooradian | 29—472.3 |
| 3,251,128 | 5/1966 | Ohno | 29—488 |

HOWARD S. WILLIAMS, Primary Examiner

T. TUFARIELLO, Assistant Examiner

U.S. Cl. X.R.

29—488; 204—15